(12) United States Patent
Kingston et al.

(10) Patent No.: US 7,263,139 B1
(45) Date of Patent: Aug. 28, 2007

(54) PHASE CORRECTION FOR A PHASE MODULATED SIGNAL WITH MUTUALLY INTERFERING SYMBOLS

(75) Inventors: Samuel C. Kingston, Salt Lake City, UT (US); Osama Sami Haddadin, Salt Lake City, UT (US); William K. McIntire, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 700 days.

(21) Appl. No.: 10/646,101

(22) Filed: Aug. 22, 2003

(51) Int. Cl.
*H03D 3/24* (2006.01)
*H03D 3/00* (2006.01)
*H04L 27/22* (2006.01)

(52) U.S. Cl. ................. 375/327; 375/344; 329/307

(58) Field of Classification Search ............. 375/324, 375/326, 327, 329, 332, 344, 346, 348; 329/304, 329/307, 345
See application file for complete search history.

(56) References Cited

U.S. PATENT DOCUMENTS

| | | | |
|---|---|---|---|
| 4,281,412 A | 7/1981 | Wissel et al. | 375/86 |
| 4,680,775 A | 7/1987 | Exarque et al. | 375/39 |
| 4,841,552 A | 6/1989 | Kingston | 377/43 |
| 4,849,998 A | 7/1989 | Poklemba | 375/121 |
| 5,050,189 A | 9/1991 | Cox et al. | 375/39 |
| 5,093,847 A | 3/1992 | Cheng | 375/97 |
| 5,448,201 A | 9/1995 | Kawabata | 329/304 |
| 5,524,126 A | 6/1996 | Clewer et al. | 375/355 |
| 5,834,986 A | 11/1998 | Myers | 332/100 |
| 5,933,467 A * | 8/1999 | Sehier et al. | 375/350 |
| 5,982,821 A | 11/1999 | Kingston et al. | 375/326 |
| 6,075,408 A | 6/2000 | Kullstam et al. | 329/304 |
| 6,363,124 B1 * | 3/2002 | Cochran | 375/326 |
| 6,370,188 B1 | 4/2002 | Wu et al. | 375/222 |
| 6,925,132 B2 * | 8/2005 | Song et al. | 375/326 |
| 2003/0118120 A1 * | 6/2003 | Menkhoff et al. | 375/327 |
| 2004/0101068 A1 * | 5/2004 | Wang et al. | 375/324 |

* cited by examiner

*Primary Examiner*—Betsy L. Deppe
(74) *Attorney, Agent, or Firm*—Harrington & Smith, PC (57) ABSTRACT

A circuit and method for correcting phase of a received phase modulated (PM) signal. The method uses k most recently received data bits, which alternate between in-phase I and quadrature Q bits, as an address for a lookup table 60. The lookup table outputs a phase figure 62 derived from a reconstructed waveform. When the most recent k bit is a Q bit, the complement 68 of the phase figure 62 is calculated to yield a phase correction. Otherwise, the phase figure is the phase correction, which is applied to adjust the phase of a delayed version of the received signal. The delayed, phase adjusted signal is then applied to correct the phase of a received signal. The circuit splits an input PM signal in parallel between a matched filter 54 and a delay block 76, 88. The matched filter output provides the input to a register 58 for storing the k data bits. The delay block holds the PM signal until it is input into a loop phase shifter 78 synchronously with the phase correction. The output of the loop phase filter is input, after filtering, to a primary phase shifter 52 that adjusts phase of a received PM signal.

13 Claims, 5 Drawing Sheets

PHASE CORRECTION FOR A PHASE MODULATED SIGNAL WITH MUTUALLY INTERFERING SYMBOLS

TECHNICAL FIELD

These teachings relate generally to phase and timing error detection and correction for demodulating and detecting a phase modulated (PM) waveform. It is particularly related to using multiple data bits to resolve phase and timing errors in PM waveforms.

BACKGROUND

Quaternary phase shift keying (QPSK) is a method of amplitude-modulating a data stream $d_k(t)$ into orthogonal in-phase $d_I(t)$ and quadrature $d_Q(t)$ data streams onto the cosine and sine functions of a carrier wave. The pulse stream $d_I(t)$ amplitude-modulates the cosine function with amplitude of +1 or −1. This is equivalent to shifting the phase of the cosine function by 0 or $\pi$, producing a binary PSK waveform. The pulse stream $d_Q(t)$ similarly modulates the sine function and yields a binary PSK waveform orthogonal to the cosine function. The summation of these two orthogonal data streams of the carrier wave yields the QPSK waveform.

In QPSK, for a pulse duration of T, each of the data streams have a pulse duration of 2T, the odd and even streams are each transmitted at a rate of 1/2 T bit/second, and every other transition of one pulse stream (I or Q) aligns with the alternate pulse stream (Q or I). Because of this alignment, the carrier phase can only change once every 2T. At every other phase change of the carrier, or every 4T, both pulses change sign at the same transition, yielding a carrier phase change of 180°.

When a QPSK waveform is filtered to reduce spectral sidelobes, these 180° phase shifts cause the carrier waveform envelope to momentarily collapse (i.e., to go to zero). When the waveform is restored, such as in satellite communications using non-linear amplifiers, all of the undesirable sidelobes are also restored, which can interfere with nearby channels and other communications systems.

Offset QPSK (OQPSK), also known as staggered QPSK (SQPSK), is a modification of QPSK in that the timing of the pulse streams $d_I(t)$ and $d_Q(t)$ is shifted such that the alignment of the two streams is offset by the pulse duration T. This staggering prevents both streams from incurring a phase change at the same time, and the waveform envelope is thereby prevented from collapsing to zero. When an OQPSK signal is bandlimited, the resulting intersymbol interference (ISI) tends to cause the envelope to droop in the region of ±90° phase transitions, but the envelope does not go to zero. When the bandlimited OQPSK signal passes through a non-linear transponder, the envelope droop is removed and the high frequency component associated with the collapse of the envelope will not be reinforced, avoiding out-of-band interference.

Minimum shift keying (MSK) may be considered a special case of OQPSK in that out-of-band interference is suppressed (as in OQPSK) but sinusoidal bit weighing is used to eliminate discontinuous phase transitions. The MSK waveform has a constant amplitude envelope with phase continuity in the RF carrier at the bit transitions. Gaussian MSK (GMSK) is the filtered or smoothed version of the MSK in which the smoothing filter is Gaussian. Quadrature amplitude modulation (M-ary QAM of M-ary PSK) also consists of two independently amplitude-modulated data streams in quadrature, but instead of a binary alphabet with two states per channel symbol period, there are M states or transitions allowing the transmission of $k=\log_2 M$ bits during each symbol period. Each block of k data bits is split into two (k/2) bit blocks. At the receiver, each of the two data streams is independently detected using matched filters.

Smoothing is desirable. It is accomplished using a root raised cosine (RRC) filter or Gaussian filter (as in GMSK), for example. This smoothing or pulse shaping smears each symbol to adjacent symbols. This interference is known as intersymbol interference (ISI), and is generally undesirable. In the case of a RRC filter, a RRC filter matched filter at the demodulator removes all ISI introduced by the RRC pulse shaping filter, thus restoring the symbols. This is not the case for Gaussian filters. Furthermore, band limiting analog circuits, anti-aliasing filters, etc., could also introduce ISI which cannot be restored easily (without proper equalization), even with a RRC matched filter. ISI affects timing error detection. This problem is particularly evident in GMSK even in the presence of equalization filters.

Each of the above waveforms (OQPSK, MSK and GMSK) is characterized by continuous phase modulation (CPM). It is understood that the concepts described herein apply not only to CPM, but to any modulation with phase coherent demodulation, such as QAM or QPSK with ISI. It is desirable to smooth the waveform in the time domain to concentrate a signal's energy in a narrower bandwidth, thereby increasing bandwidth efficiency by allowing adjacent signals to be packed closer together. However, that smoothness produces ISI and tends to obscure or eliminate the symbol transition features upon which many symbol timing synchronizations schemes depend. Related to this is the problem that the effects of carrier phase error are difficult to separate from symbol timing error in CPM and OQPSK signals. Since the phase of the carrier is unknown, either the in-phase or the quadrature data stream in the demodulator is blindly delayed.

The symbols are not yet in phase alignment, so there tends to be mixing with nearby symbols and phases. The present invention is directed to providing a phase and timing error when multiple symbols influence the data samples.

SUMMARY OF THE PREFERRED EMBODIMENTS

The foregoing and other problems are overcome, and other advantages are realized, in accordance with the presently preferred embodiments of these teachings. One aspect of the present invention is a method to correct a phase of a received phase modulated (PM) signal. The method includes applying a received phase modulated (PM) signal to a first circuit branch and a second circuit branch. In the first circuit branch, k data bits are selected from the received PM signal, wherein a data bit received most recently corresponds to time $t_1$ and wherein k is an integer greater than one.

A phase error is determined based on the k data bits. In the second circuit branch, the received PM signal is delayed to a second time $t_2$ that is later than $t_1$. The phase error is applied to at least a portion of the delayed PM signal at the second time $t_2$, a phase offset is calculated from the delayed PM signal; and the phase offset is used to correct phase of a PM signal that is received at a time later than $t_1$.

Another aspect of the present invention is a circuit for correcting a phase of a phase modulated (PM) signal. The circuit includes a first circuit branch wherein a primary phase shifter, a register, one of an algorithm sub-circuit and a lookup table sub-circuit, and a loop phase shifter are arranged in electrical series, in that order. The second circuit branch has an input in parallel with the first circuit branch, and component within the second circuit branch include a delay block and the loop phase shifter, which are arranged in electrical series, in that order. The loop phase shifter is common to both circuit branches. The register is for storing at least two data bits sampled from the received PM signal. The loop phase shifter has an output coupled to an input of the primary phase shifter.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
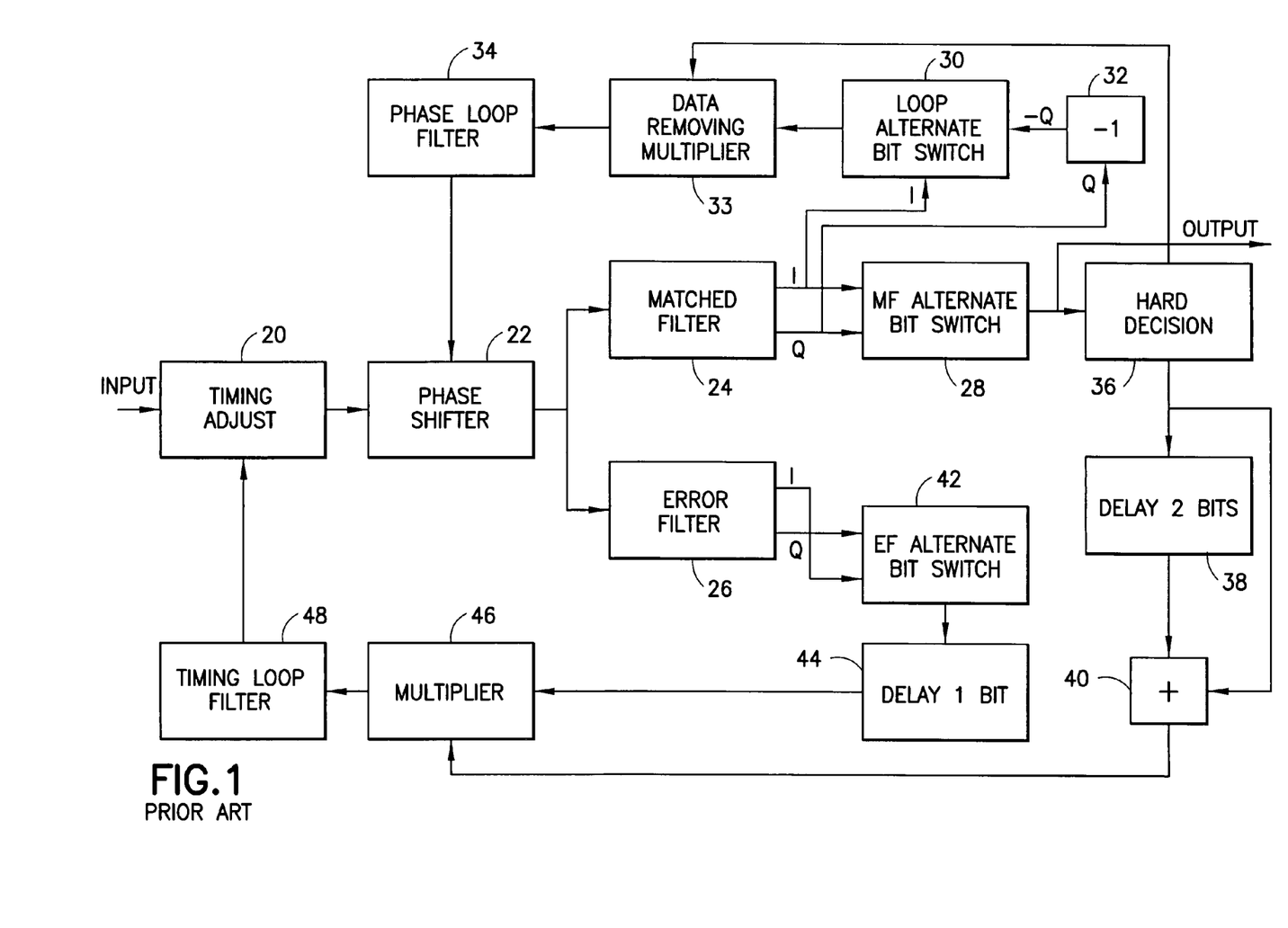
FIG. 1 is a block diagram for correcting timing and phase in a continuously modulated (CPM) waveform according to the prior art.

FIG. 1 is a block diagram showing phase and timing correction loops for a received CPM signal according to the prior art. A received signal is split into in-phase I and quadrature Q components which are input serially into a timing adjust block 20 that adjusts timing according to a timing loop to be described. From the timing adjust block 20, the alternating I and Q bit stream passes into a phase shifter 22 that adjusts phase of the input I-Q signal according to a phase loop to be described.

From the phase shifter 22, the I-Q bit stream is equally split and passed into two filters, a matched filter 24 and an error filter 26. The matched filter 24 recovers the baseband sample at maximum signal to noise ratio for each bit. For CPM, the matched filter can be described by the first Laurent pulse or pulses. The matched filter 24 makes soft decisions concerning each data point. Additionally, the matched filter 24 splits the serial I-Q bit stream into an I bit stream that includes only the in phase bits and a separate Q bit stream that includes only the quadrature bits. The matched filter 24 samples the bit stream that was input at regular intervals. Many prior art CPM phase and timing correction circuits sample twice per bit time interval in order to resolve peak and zero crossing points of the data bits. The error filter 26 similarly splits the bit stream input thereto, and the error filter 26 may also be a matched filter similar to that described above. Sampling at the error filter 26 matches that of the matched filter 24.

The separate I and Q bit streams pass from the matched filter 24 into a MF alternate bit switch 28 (i.e., the alternate bit switch that is paired with the matched filter 24). The MF alternate bit switch 28 re-assembles the separate streams into a single bit stream of alternating I and Q bits by alternately sampling the two data streams input thereto. The separate I and Q streams also pass from the matched filter 24 into the phase correction loop, which in the simplified version depicted in FIG. 1 includes the phase shifter 22, the matched filter 24, a loop alternate bit switch 30, a sign (+/−) inverter 32, a data removing multiplier 33, and a phase loop filter 34. The separate I and Q bit streams pass into the loop alternate bit switch 30, the I bit stream directly, and the Q bit stream after passing through the sign inverter 32. The inputs into the loop alternate bit switch 30 are then I and −Q. The loop alternate bit switch 30 outputs each of the I and −Q bits at offset times, so that the I bits are at the Q times and the −Q bits are at the I times. The I or Q bits is then removed by the multiplier 33. This yields, in simplified form, a representation of phase error. The data stream is then output serially from the loop alternate bit switch 30 to the phase loop filter 34. The output of the phase loop filter 34 is then the phase error with large magnitude corrections filtered out, and is used to correct the phase of the received signal at the phase shifter 22.

The remainder of FIG. 1 is the timing loop. As above, the MF alternating bit switch 28 outputs a single bit stream of alternating I and Q bits. The value of each bit at this juncture is a soft decision that is output from the diagram of FIG. 1 to downstream components such as a decoder, and is also input into a hard decision block 36 for timing feedback within FIG. 1. The hard decision block 36 selects an idealized value for each bit and outputs that ideal value to an adder 40. The adder 40 subtracts the idealized bit value with the value of the bit preceding it by two. That is, the output of the hard decision block 36 is input into an adder and into a delay 2-bit block 38. The delay 2-bit block 38 outputs a bit delayed by two pulse widths to the adder 40. This subtracts the early data decisions (made at the hard decision block 36) from the late data decisions. Because the delay is 2 data bits, I bits are matched with other I bits at the adder 40, and Q bits are matched with other Q bits. The output of the adder 40 is the sign (+/−) of the summed result, which yields the sign (+/−) of the timing error if the data changes value and 0 if it does not.

The error filter 26 outputs separate I and Q bit streams to an EF alternating bit switch 42 similar to the description above for the MF alternating bit switch 28. The output of the EF alternating bit switch 28 is a serial stream of alternating I and Q bits. This output is then delayed one bit 44 to put the Q bits on the I times and the I bits on the Q times. This yields the magnitude of the timing error. The magnitude of the timing error (output of delay 1-bit 44) is multiplied with the sign of the timing error (output of the adder 40) at the multiplier 46. The result of the multiplier 46 is filtered by a low pass timing loop filter 48 that removes undesirable components, and applied to the timing adjust block 20 to correct the timing of the received CPM signal. The above is a simplified prior art circuit, herein termed the classic model.

Figure 2:
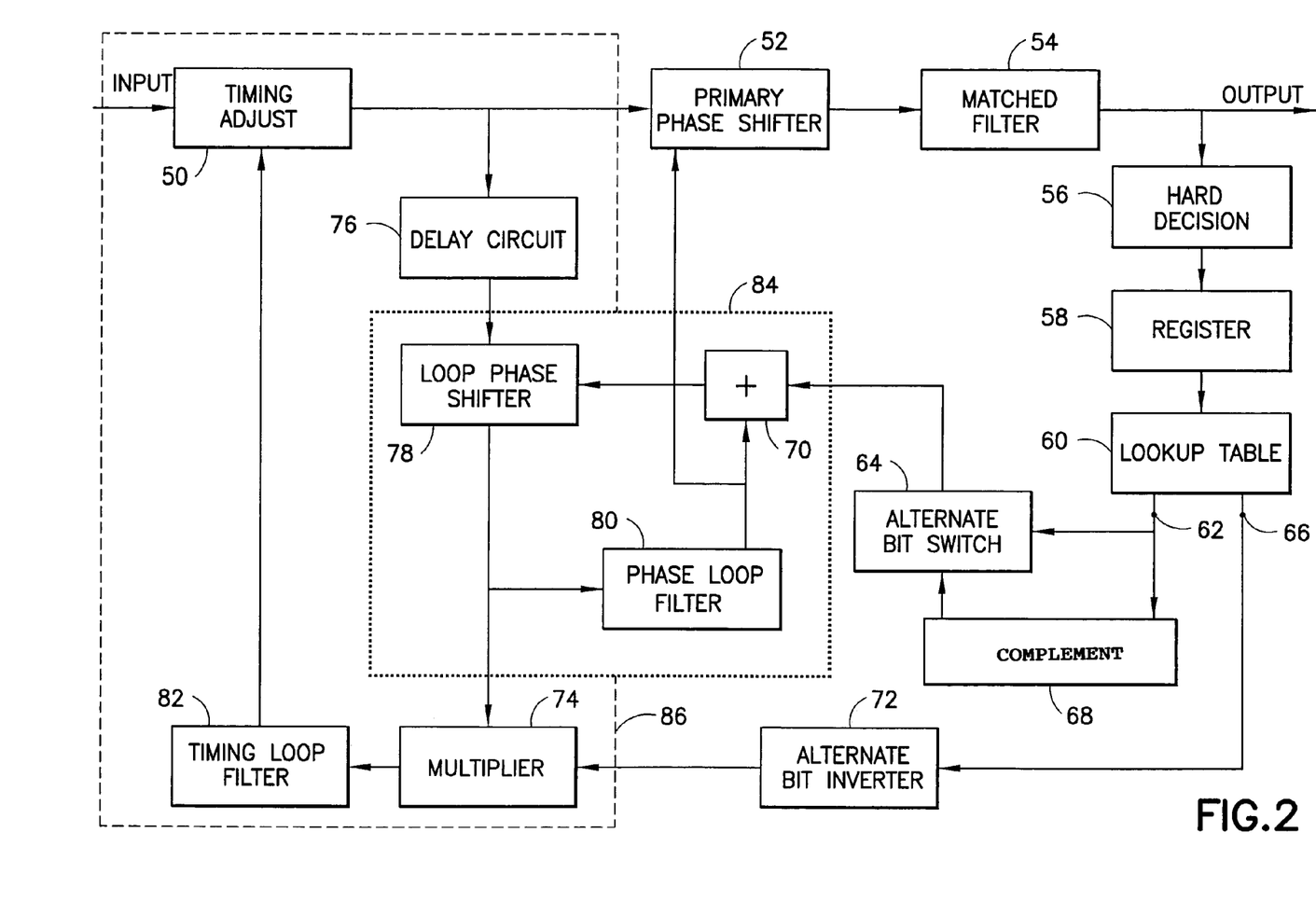
FIG. 2 is a block diagram of the preferred embodiment of the present invention for correcting phase and timing in a PM waveform.

FIG. 2 is a block diagram representing the preferred embodiment of the present invention. A received PM signal, preferably a continuously phase-modulated (CPM) signal (labeled 'input'), is input into a timing adjust block 50 that time-synchronizes the signal. The timing adjust block 50 corrects timing of the input signal in accordance with a timing loop detailed below. The output of the timing adjust block 50 is the input to a primary phase shifter 52, which corrects the phase of the received CPM signal as detailed below. The output of the primary phase shifter 52 passes into a matched filter 54 that is preferably determined by the first term of a Laurent decomposition to demodulate the data using the undelayed CPM signal. The matched filter 54 splits the signal into in-phase I and quadrature Q components. The matched filter 54 alternately samples the I and Q components at a rate preferably equal to one sample per pulse width $T_b$, producing an output data bit stream $z_I(T_1)$, $z_Q(T_2)$, $z_I(T_3)$, $z_Q(T_4)$, etc., wherein each $T_k$ is an integer multiple of the data pulse width $T_b$. As is conventional, even numbers designate bits drawn from the in-phase component of the signal (I bits) and odd numbers designate bits drawn from the quadrature component of the signal (Q bits). Alternatively, the matched filter 54 may sample more than once per bit rate T (e.g., 2 samples/bit=$2T_b$). For each data bit input, the matched filter 54 recovers the baseband pulse with the best ratio of bit energy to noise power spectral density ($E_b/N_0$). The matched filter 54 makes soft decisions concerning each data point, which is output from the block diagram of FIG. 2 (at the arrow labeled 'output'), preferably to a forward error correction (FEC) decoder.

The output of the matched filter 54 also passes into a hard decision block 56. The hard decision block 56 regenerates the transmitted bits used to modulate the carrier based on the amplitude of the I and Q components input thereto. In other words, the hard decision block 56 provides estimated bits that most closely match the actual data of the I and Q bits input from the originally transmitted signal. In the concept of a waveform constellation, the hard decision block 56 determines a constellation point for an individual received bit regardless of variance of the received bit from any idealized constellation point. The output from the hard decision block 56 is then an idealized reconstruction of the actual transmitted bit (minus any bit error rate). Because these are reconstructed to reflect the transmitted signal, they may be considered 'known' data bits.

Each successive bit that is output from the hard decision block 56 is stored in a register 58 that holds k such bits on a first-in first-out (FIFO) basis. That is, the register 58 holds the values for the k most recent data bits received from the hard decision block 56. Conceptually, the most recently stored bit is at the left and the oldest stored bit is at the right, and the series moves from left to right each sample time, dropping the rightmost (oldest) bit from the register and adding the leftmost (most recent) bit. To most accurately reconstruct the transmitted waveform, the register 58 should hold the same number of data bits as the number of data bits over which intersymbol interference (ISI) may be spread. Where a finite impulse response (FIR) filter at the transmit side of a communication uses n inputs, the register of the present invention a the receive side of the communication will preferably hold n+1 data points. ISI is related to bandwidth B and pulse width $T_b$, and may differ for different modulation schemes. For example, ISI is spread over $$\frac{1}{BT_b} + 1$$

data bits in GMSK. Where a GMSK waveform is defined by $BT_b=1/6$, ISI is spread over 7 data bits. The register 58 will ideally hold 7 data bits in the above example so that phase and timing for a waveform reconstructed for a time $t_1$ in accordance with the present invention may be calculated using appropriately weighted inputs from the data bit corresponding to time $t_1$ and the six data bits previous to the $t_1$ data bit. Each of those seven bits is influenced by ISI, and therefore contributes to phase and timing error in the (uncorrected) received signal.

The most recent k bits stored in the register 58 are then preferably used as an address to access a lookup table 60. The lookup table 60 yields two results from the single k-bit address: a phase figure 62 and a symbol tracking signal 66. Alternatively, an algorithm may be used in place of the lookup table 60. In that alternative instance, the most recent k bits stored in the register 58 may be an input to an algorithm such as one used to generate entries for a lookup table, and weighted appropriately, to yield a phase figure 62 and a symbol tracking signal 66. Where the matched filter 54 samples more than once per pulse width $T_b$, the phase figure 62 for each sample is preferably produced from the lookup table 60 only once per bit. Preferably, the lookup table is stored in random access memory (RAM).

Whether a lookup table 60 or an algorithm is used, the resulting phase figure 62 reflects a weighted influence of each of the k data bits on phase (or phase error). The weighting factors are merely multipliers applied to each data bit. For an algorithm, the multipliers will be obvious. For a lookup table 60, the different multipliers are inherent in developing the lookup table 60 and are thus reflected in the output from the table. The different multipliers are preferably related to chronological proximity of each data bit to the most delayed sample, wherein more recent data bits (nearer the center of the register) are weighed heavier than early or late data bits (nearer the edges of the register).

The error signals are derived from the reconstructed waveform by correlating the delayed sample 76 with the derivative with respect to carrier phase of the conjugate of the reconstructed waveform for the phase error, or the derivative with respect to time of the conjugate of the reconstructed waveform for the timing error. The real part of the complex result is the error signal. For CPM, wherein the waveform is represented generally by $s(t)=\exp\{j[\omega_0 t+\theta+\psi(t-\tau, \alpha)]\}$ (wherein $\omega_0$ is the carrier frequency, $\theta$ is the carrier phase relative to the receiver, and $\psi(t-\tau, \alpha)$ is the excess phase of the signal), the derivative with respect to carrier phase of the conjugate of the reconstructed waveform is j multiplied by the conjugate of the reconstructed waveform. For CPM, the conjugate of the reconstructed waveform is equivalent to subtracting the reconstructed phase, so the error is j times the real or the imaginary part of the result shifted by the reconstructed phase. The derivative with respect to time is the derivative with respect to phase multiplied by the derivative of the phase command (the phase figure 62) with respect to time. These derivatives are stored in the lookup table 60. Because alternate bit phase values are complemented in the above procedure, alternate bit phase derivatives are inverted at an alternate bit inverter block 72. Using the above procedure, the block in FIG. 2 labeled lookup table 60 represents both the lookup table itself and the above operations on the phase command (the phase figure 62) extracted from the lookup table.

Generally, there are three methods to determine the contents of a lookup table for phase estimation such as described above. One method is to mathematically determine phase estimates from the basic equations that identify the waveform (GMSK, for example). This method is only accurate to the extent that interference is caused by the modulation and pulse shaping. In instances where analog filtering and/or the channel itself causes additional interference, this mathematical method does not accurately reflect the received waveform. Preferably, a lookup table is populated with data determined via mod/demod simulations or actual data transfers. In the former, data is captured for a predetermined pattern, which can include models of analog filter contributions and channel effects. In the latter, the output of a matched filter within a modem covers all possible permutations, and reflects interferences caused by the hardware.

The phase figure 62 is a predicted phase of the transmitted waveform during the $(k/2)^{th}$ data bit prior to the most recent bit as a function of the k most recent bit decisions, and includes ISI. Using the preferred k number of bits as noted above, the received signal, with its phase corrected as described below in accordance with the lookup table 60 output, yields a reconstructed waveform that eliminates the phase-related effects of ISI. Where the lookup table 60 is derived for the in-phase I data bits, the output phase figure 62 may be used directly as an estimate of the phase. The same look-up table 60 may also be used to deduce an estimate of phase from the quadrature data bits because the phase estimate for the quadrature data bit is simply the compliment of the phase estimate (one quarter cycle minus the phase estimate) of the corresponding in-phase data bit. As an alternative to the single abbreviated lookup table 60 detailed above, two lookup tables (or a larger lookup table with data from two such tables) may be employed, one for addresses from the register having a leading I bit, the other for addresses from the register having a leading Q bit.

It is a feature of GMSK modulation that dθ/dt inverts on every Q bit. Since the register 58 operates on alternating I and Q bits, a combination alternate bit switch 64 and complement block 68 are imposed as shown to correct the sign of the Q bits (which are inverted for GMSK as above). The phase figure 62 (for example, the $n^{th}$ bit which corresponds to the most recent data bit in the register 58 being an in phase bit) passes directly through the alternate bit switch block 64 without modification. The alternate bit switch block 64 then switches to receive the next succeeding phase figure (for example, the $n^{th}$+1 bit which corresponds to the most recent data bit in the register 58 being a quadrature bit) from the complement block 68. The alternate bit switch block 64 receives only one input at an given instant, alternating between an input directly from the lookup table 60 and an input from the complement block 68. Since the example $n^{th}$ bit was an in phase bit, the next succeeding $n^{th}$+1 bit is necessarily a quadrature component. The quadrature $n^{th}$+1 reconstructed phase passes through the compliment block 68, which takes the complement of the phase (one quarter cycle minus the phase) for the quadrature bits. The alternating bit switch block 64 thus alternates its output between in phase and quadrature bits. This allows the same lookup table 60 to be used at the in-phase and quadrature bit times.

The adder 70 takes as inputs the phase estimate from the lookup table 60 (the phase estimate being either the phase figure 62 for the I bits or the complement of the phase figure 62 for the Q bits), and a phase offset from the phase loop filter 80. Adding these two inputs at the adder 70 yields a reconstructed phase correction.

In addition to being the input to the primary phase shifter 52, the timing adjusted signal that is output from the timing adjust block 50 is also directed to a delay circuit 76, which imposes a delay to synchronize the bit passing through the delay circuit 76 with its corresponding bit decision that passes through the midpoint of the FIFO register 58. Synchronization of these two corresponding bits occurs at two nodes: the multiplier 74 and the loop phase shifter 78.

The embodiment shown in FIG. 2 imposes no delay at the phase loop 84 (which includes the loop phase shifter 78, the phase loop filter 80, and the adder 70) at the cost of an extra phase shifter for data decisions. A timing loop 86 (that includes the timing adjust block 50, the delay circuit 76, the loop phase shifter 78, the multiplier 74, and the timing loop filter 82) does impose a delay that could require less than desired loop gains. Use of a second timing adjust after an unadjusted delay would remove the delay from the timing loop, as described below in conjunction with FIG. 3.

After the delay circuit 76, the time-delayed stream of samples passes into a loop phase shifter 78. These input samples still include ISI. The phase shifter 46 uses the reconstructed phase correction from the adder 70, detailed above, to phase compensate the time-delayed signal that is input from the delay circuit 76. The output from the loop phase shifter 78 is therefore a time-delayed version of the received waveform that is phase compensated. This time-delayed, phase compensated waveform is input into a low pass phase loop filter 80, which removes undesirable high frequency components from the waveform that was input thereto and outputs a phase offset.

The phase offset from the phase loop filter 80 is input into both the adder 70 and the primary phase shifter 52. Though the phase offset from the phase loop filter 80 may retain some channel-related phase errors, those phase errors due to ISI are eliminated. In the primary phase shifter 52, the phase offset is used to correct the phase of the signal passing therethrough. Any outputs to downstream components such as the FEC decoder are thus phase compensated.

As noted above, phase and timing error in a CPM waveform are related. The present invention provides that timing correction may be made with the same lookup table 60 that was used for phase correction. Along with the phase figure 62, the lookup table 60 also outputs a symbol tracking signal 66. Preferably, the symbol tracking signal 66 is the time derivative of the phase, dφ/dt. In this manner, a single, relatively abbreviated lookup table 60 may be used to generate both outputs, phase figure 62 and symbol tracking signal 66. Where the symbol tracking signal 66 is the time derivative of the phase dφ/dt, a feature of continuous phase modulation (CPM) is that every time derivative of phase dφ/dt that corresponds to a quadrature bit has an inverted sign (+ or −). In phase error correction, this was compensated by taking the complement of the Q related phase figure 62. In timing error correction, this is compensated by passing every time derivative related to a Q bit through an alternate bit inverter 72. In short, every derivative corresponding to an I bit passes unchanged through the alternate bit inverter 72, and every derivative corresponding to a Q bit passes through the alternate bit inverter 72 with only its sign (+ or −) changed. The output of the alternate bit inverter 72 is a (sign corrected) weighting factor that is dependent upon the bit pattern stored in the register 58 at the time the relevant bit k first entered the register 58. This weighting factor (the output of the alternate bit inverter 72) is input into a multiplier 74, which is part of the timing loop.

The timing loop comprises the timing adjust block 50, the delay circuit 76, the loop phase shifter 78, the multiplier 74, and a timing loop filter 82. Along with the output of the alternate bit inverter 72 as detailed above, one other input to the multiplier 74 is the output of the loop phase shifter 78, also detailed above. The output of the loop phase shifter 78 is a delayed version of the received signal that is phase compensated. Since the output of the alternate bit inverter 72 is just a weighting factor, the multiplier applies that weighting factor to the output of the loop phase shifter 78 to result in a timing offset signal. The timing offset signal that is output from the multiplier 74 is then passed through a timing loop filter 82, which filters out undesirable high frequency components, and input into the timing adjust block 50. There, the filtered timing offset signal is used to adjust the timing of the received CPM signal.

The delay circuit 76 is tailored to synchronize the two inputs at the multiplier 74, as previously noted. In the event that the overall circuitry of an embodiment of this invention precludes a single delay block to synchronize at both nodes (multiplier 74 and loop phase shifter 78), a supplementary delay block may be imposed between the loop phase shifter 78 and the multiplier 74 at a location after the output of the loop phase shifter 78 passes to the phase loop filter 80. In the embodiment of FIG. 2, this would be located immediately above the multiplier 74.

Figure 3:
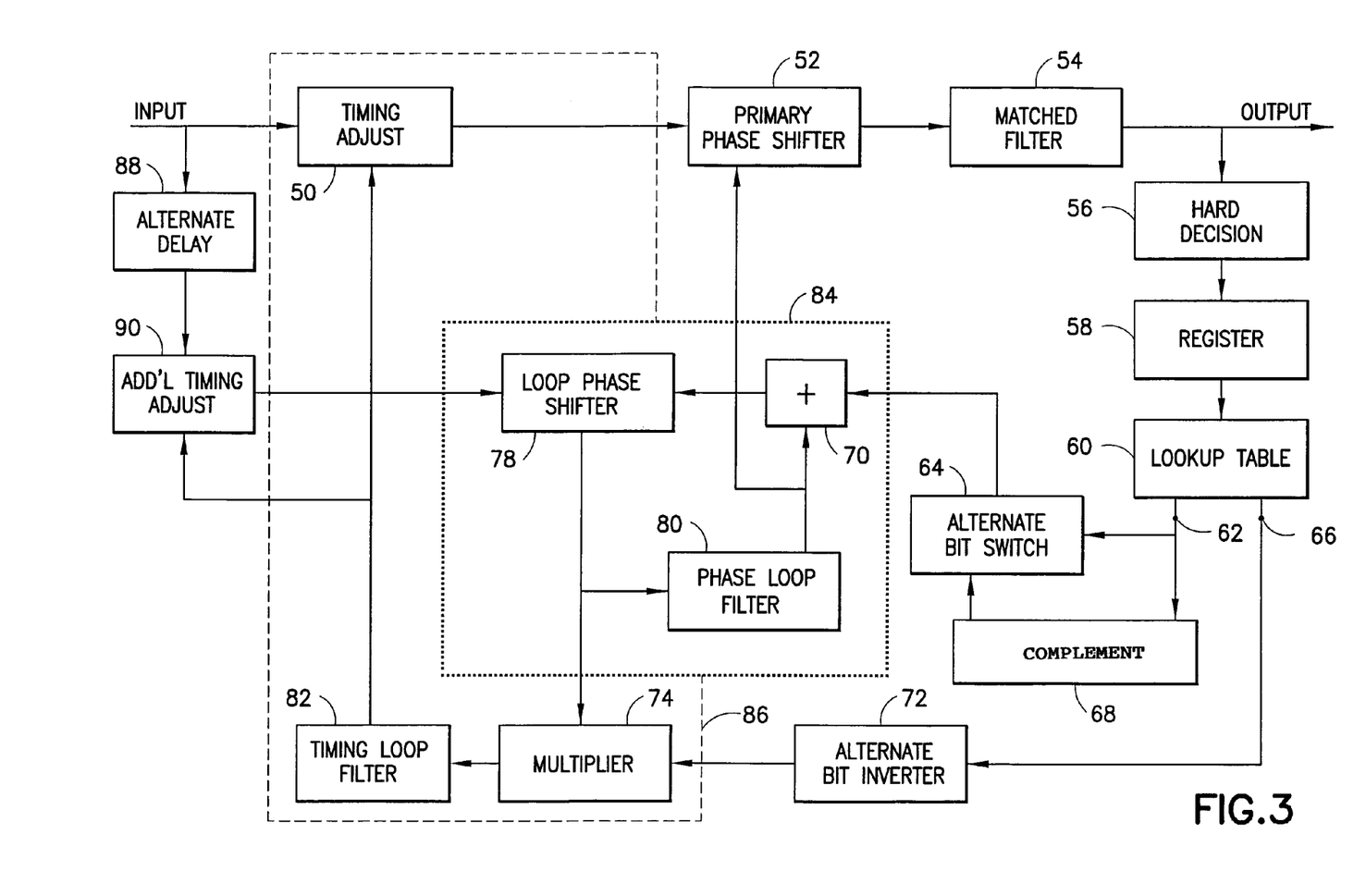
FIG. 3 is similar to FIG. 2 but wherein the delay is moved outside the timing loop.

FIG. 3 presents an alternative disposition of the delay. Rather than impose a delay block 76 within the timing loop 86 as in FIG. 2, FIG. 3 taps the input phase modulated signal and directly inputs it into an alternate delay block 88 that remains outside the timing loop 86. This disposition necessitates an additional timing adjust block 90 between the alternate delay 88 and the loop phase shifter 78 to ensure that the phase correction applied at the loop phase shifter 78 is applied to a synchronized version of the PM signal that is adjusted for timing. Other components of the circuit shown in FIG. 3 are similar to those shown and described in FIG. 2.

Simulation Data

In the following disclosure of simulated results, the "classic model" refers to the prior art phase and loop tracking and correction described with reference to FIG. 1, and the "reconstructed model" refers to the present invention as embodied and described with reference to FIG. 2.

Figure 4:
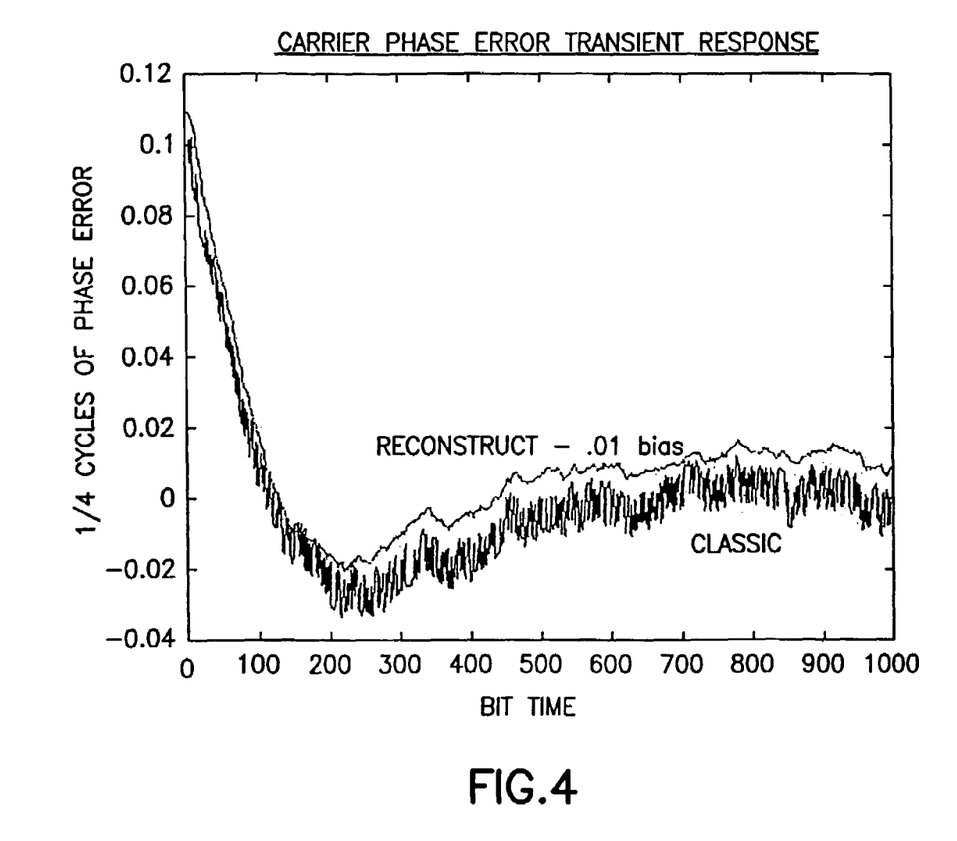
FIG. 4 is a graph comparing phase error performance of a prior art error correction circuit and a circuit according to the preferred embodiment of the present invention.
Figure 5:
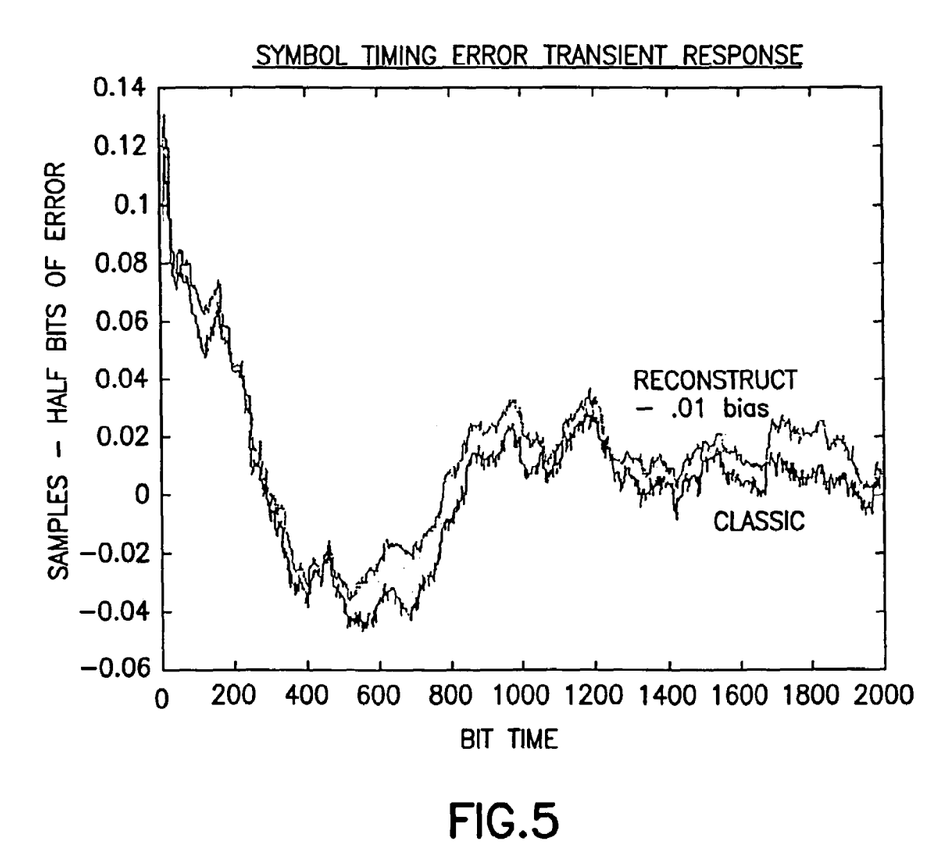
FIG. 5 is a graph similar to FIG. 4 but comparing timing error performance.

FIGS. 4 and 5 are graphs comparing phase error and timing error performance, respectively, for the classic model and the reconstruction model. Random data was modulated using a CPM lookup table at 2 samples per bit. The table was generated for GMSK with a 1/6 bit rate bandwidth and a length of 7 bits (14 samples) in the register. These complex samples were phase shifted with the phase error signal and Gaussian noise was added. Timing error was modeled by a quadratic interpolation of the samples about the lock point. This gives valid signals up to at least 0.5 samples of time error. The data is demodulated alternately on I and Q with a four tap matched filter 0.72, 1, 1, 0.72. The tracking error signal for the two models are derived and their gain adjusted to give white noise of 0.01 per bit for carrier (phase) and 0.005 for timing. Zeta is an underdamped 0.5. Transient response from a 0.1 quarter cycle of phase (FIG. 4) and 0.1 samples of time (FIG. 5) is shown at 20 dB $E_s/N_0$. The waveform reconstruction curves are biased upward as indicated for clarity.

With both the phase loop and the timing loop open and no error, the $E_b/N_0$ had to be increased by 1.7 dB to give the theoretical 0.023 bit error rate (BER) for 3 dB $E_b/N_0$. This implies a GMSK matched filter implementation loss of 1.7 dB. The loss calculated the same way with both phase and timing loops closed is 2.0 dB for either model.

50K-bit runs were made with both phase and timing loops closed at both 3 dB and 20 dB $E_b/N_0$. Both models were run with three different random number seeds. The resulting root mean square (rms) phase jitter in samples or 1/4 phase cycles is tabulated.

|  | Reconstructed Model - Min. | Reconstructed Model - Max. | Classic Model Min. | Classic Model Max. |
| --- | --- | --- | --- | --- |
| 3 dB Time | 0.0937 | 0.1085 | 0.0983 | 0.1187 |
| 20 dB Time | 0.0109 | 0.0127 | 0.0118 | 0.0144 |

-continued

|  | Reconstructed Model - Min. | Reconstructed Model - Max. | Classic Model Min. | Classic Model Max. |
| --- | --- | --- | --- | --- |
| 3 dB Phase | 0.0625 | 0.0646 | 0.0604 | 0.0683 |
| 20 dB Phase | 0.0045 | 0.0048 | 0.0060 | 0.0067 |

50K-bit runs were made in both simulations with one of the loops open while the other was closed at 3 dB. Jitters typically increased by 0.3 dB when both loops were closed. This is probably due to error induced signal to noise ratio (SNR) degradations and increased bit errors more than any type of loop cross talk.

50K-bit runs were made at 3 dB using actual instead of estimated data to determine the effects of decision errors. Results were similar for both models. The timing had about a 1.5 dB decrease in jitter while the phase had a more substantial 5.5 dB decrease. These improvements can be achieved during a known preamble of header in the received signal.

In summary, the reconstruction model of the present invention showed a decrease in rms timing jitter of about 0.6 dB at an $E_b/N_0$ at both 3 dB and 20 dB as compared to the prior art classic model. There was no significant decrease in rms phase jitter at 3 dB, but a 2.8 dB decrease in phase jitter at 20 dB as compared to the prior art classic model. This improvement is due to the prior art classic model producing a phase self-noise that goes to zero at DC, so the improvement decreases with decreasing loop bandwidth as well as with decreasing $E_b/N_0$.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:

1. A method to correct a phase of a received phase modulated (PM) signal, comprising:
    applying a received phase modulated (PM) signal to a first circuit branch and a second circuit branch;
    in the first circuit branch, selecting k data bits from the received PM signal, wherein a data bit received most recently corresponds to time $t_1$ and wherein k is an integer greater than 1;
    determining a phase error based on the k data bits;
    in the second circuit branch, delaying the received PM signal to a second time $t_2$ that is later than $t_1$;
    applying the phase error to at least a portion of the delayed PM signal at the second time $t_2$;
    calculating a phase offset based on the delayed PM signal; and
    using the phase offset to correct the phase of a PM signal received at a time later than $t_1$.

2. The method of claim 1 wherein selecting k data bits comprises arranging the k data bits serially so as to alternate between in-phase and quadrature bits.

3. The method of claim 1 further comprising:
    setting k equal to a total number of data bits that influence the phase of the received PM signal at the first time $t_1$.

4. The method of claim 1 wherein $$k = 1 + \frac{1}{BT},$$

wherein B is a bandwidth of the received PM signal and T is a bit interval of the received PM signal.

5. The method of claim 1 wherein determining the phase error includes accessing, using the k data bits, a lookup table.

6. The method of claim 5 wherein determining the phase error further comprises inverting an output of the lookup table when the most recent data bit is one of an in-phase or a quadrature data bit.

7. The method of claim 1 wherein determining the phase error based on the k data bits comprises correlating the k data bits except the most recent data bit with a derivative with respect to phase of a conjugate of a reconstructed waveform.

8. The method of claim 7 wherein the derivative with respect to the phase is stored in a lookup table.

9. A circuit to correct a phase of a phase modulated (PM) signal, comprising:
a first circuit branch wherein a primary phase shifter, a register, one of an algorithm sub-circuit and a lookup table sub-circuit, and a loop phase shifter are arranged in electrical series, in that order;
a second circuit branch having an input in parallel with the first circuit branch, wherein a delay block and the loop phase shifter are arranged in electrical series, in that order;
the register for storing at least two data bits sampled from the PM signal; and
the loop phase shifter having an output coupled to an input of the primary phase shifter.

10. The circuit of claim 9 wherein the at least two data bits comprises a series that alternates between an in-phase bit and a quadrature bit.

11. The circuit of claim 10 wherein the first circuit branch further comprises a complement block disposed between the loop phase shifter and the one of the algorithm sub-circuit and the lookup table sub-circuit.

12. The circuit of claim 9 wherein the at least two data bits comprises $$k = n\left(1 + \frac{1}{BT}\right)$$

data bits, wherein n is a number of samples per bit interval that is greater than or equal to one, B is a bandwidth of the PM signal and T is a bit interval of the PM signal.

13. The circuit of claim 9 wherein the one of the algorithm sub-circuit and the lookup table sub-circuit produces the phase correction by correlating all data bits in the register, except the most recent data bit, with a derivative with respect to phase of a conjugate of a waveform reconstructed from the PM signal.

* * * * *